United States Patent [19]
Matsumoto

[11] Patent Number: 4,496,336
[45] Date of Patent: Jan. 29, 1985

[54] PULLEY DEVICE
[75] Inventor: Akio Matsumoto, Himeji, Japan
[73] Assignee: Mitsubishi Denki Kabushiki Kaisha, Tokyo, Japan
[21] Appl. No.: 373,104
[22] Filed: Apr. 29, 1982
[51] Int. Cl.³ ...................... F16H 55/42; F16H 55/36
[52] U.S. Cl. .................... 474/181; 474/176; 474/179
[58] Field of Search ............. 474/176, 166, 174, 181, 474/182, 183; 228/263.15, 263.16, 112, 113, 114

[56] References Cited
U.S. PATENT DOCUMENTS

| 3,144,710 | 8/1964 | Hollander et al. | 228/112 |
| 3,506,311 | 4/1970 | Nobach | 228/112 |
| 3,611,535 | 10/1971 | Nobach | 228/112 |
| 3,842,475 | 10/1974 | Clasper | 228/113 |
| 3,874,067 | 4/1975 | Toyooka et al. | 228/2 |
| 3,898,888 | 8/1975 | Frost et al. | 474/181 |
| 3,904,383 | 9/1975 | Murphy et al. | 228/263.16 |
| 3,963,162 | 6/1976 | Taguchi et al. | 228/263.15 |
| 3,977,869 | 8/1976 | Steine et al. | 228/263.15 |
| 4,079,491 | 3/1978 | Richardson | 228/113 |

FOREIGN PATENT DOCUMENTS

| 76998 | 1/1954 | Denmark | 474/181 |
| 2211387 | 9/1973 | Fed. Rep. of Germany | 228/114 |
| 8220 | 2/1981 | Japan . | |
| 56-18159 | 2/1981 | Japan | 474/181 |

Primary Examiner—Lawrence J. Staab
Assistant Examiner—Dwight G. Diehl
Attorney, Agent, or Firm—Oblon, Fisher, Spivak, McClelland & Maier

[57] ABSTRACT

A pulley device having a V-groove is formed by friction welding a pair of stamped steel plates together. A metal plate having a melting temperature lower than the steel plates is placed between the plates to melt-bond therewith by friction welding.

1 Claim, 4 Drawing Figures

PULLEY DEVICE

BACKGROUND OF THE INVENTION

1. Field of the Invention

The present invention relates to a pulley device. More particularly, it relates to an improvement in a pulley device of an AC generator for a car.

2. Description of Prior Art

FIGS. 1 and 2 illustrate the conventional pulley device for an AC generator for a car. In the figures, the reference numeral (1) designates an steel plate which is formed by stamping and has a through-hole (1a) for receiving a shaft at the central portion and (2) designates the other steel plate which is associated with the former steel plate (1) to form a V-groove (3) and which is formed by stamping into a shape the same as the former steel plate and has a through-hole for receiving a shaft (2a) at the central portion. (4) designates a V-belt wound on the V-groove (3) and (1b), (2b) designate contact surfaces of the steel plates (1), (2) welded by mutual friction.

In preparing the conventional pulley device, the steel plates (1), (2) having the same shape are formed by stamping and one of the steel plate (1) is rotated under the condition that the contact surfaces (1b), (2b) of both the steel plates (1), (2) are in press contact as shown in FIG. 2 to produce frictional heat between the contact surfaces (1b), (2b) so as to melt-bond the steel plates (1), (2), thereby fabricating a pulley device having the V-groove (3).

In the conventional pulley device obtained by friction welding, steel plates (1), (2) are molten by the frictional heat and solidified. In other words, the steel plate are once heated to the melting temperature and then cooled, whereby heat stress is easily produced. This causes deformation of the shape of the V-groove (3) which severely wears the V-belt (4). Sometimes, the V-belt (4) is dropped out the V-groove (3).

SUMMARY OF THE INVENTION

It is an object of the present invention to overcome the disadvantage of the conventional pulley device and to provide a pulley device without causing deformation of the V-groove.

The foregoing and the other object of the present invention have been attained by providing a pulley device having a V-groove which is prepared by melt-bonding by a friction welding a pair of steel plates formed by stamping wherein a metal plate having a relatively lower melting temperature is placed between the steel plates to melt-bond therewith by a friction welding.

DETAILED DESCRIPTION OF PREFERRED EMBODIMENT

Figure 1:
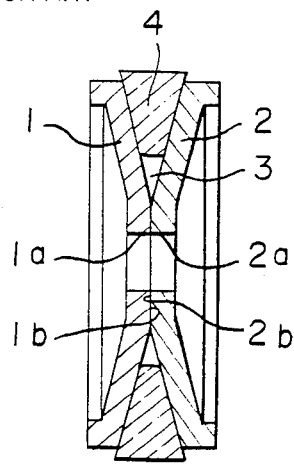
FIGS. 1 and 2 are respectively sectional views of the conventional pulley device.
Figure 2:
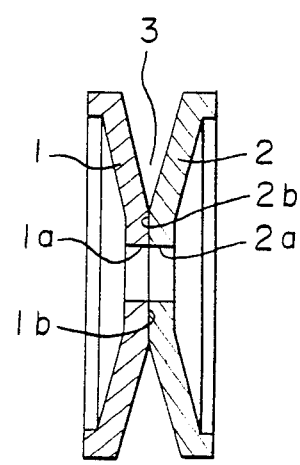
Figure 3:
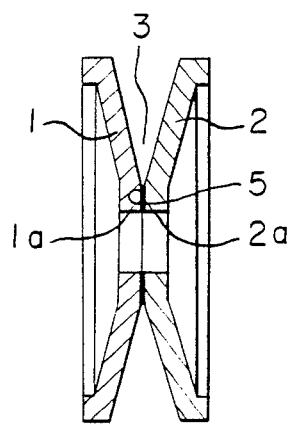
FIGS. 3 and 4 are respectively cross sectional views of an embodiment of the pulley device of the present invention.
Figure 4:
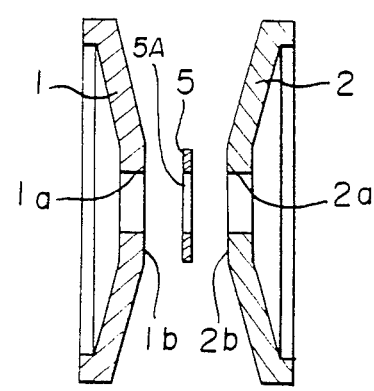

An embodiment of the pulley device of the present invention will be described with reference to FIGS. 3 and 4.

In the Figures, the reference numeral (5) designates an annular copper plate fitted between the contact surfaces (1b) (2b) of the steel plates (1), (2) and a through-hole (5a) having a diameter substantially the same as those of the through-holes (1a), (2a) is formed in the copper plate at the central portion.

In the embodiment, the pulley device having a V-groove (3) is prepared by stamping two steel plates (1), (2) having the same shape; sandwiching the copper plate (5) between the contact surfaces (1b) (2b) of the steel plates (1), (2); rotating one (1) of the steel plates to produce frictional heat between the copper plate (5) and the contact surfaces (1b) (2b) so as to melt-bond the copper plate (5) to the adjacent steel plates (1), (2).

It is desired to form a copper plate having an outer diameter substantially the same as that of contacting area of the contact surfaces to give a large bonding area as possible.

As the sandwiched metal plate, any metal having melting temperature lower than that of steel and having an excellent bonding characteristic to the steel can be used. The most desirable material is copper or copper alloy from the viewpoint of cost and bonding characteristic to steel.

The ratio of the thickness of the sandwiched metal plate to that of the steel plate is less than 1:10. In tests, desired result was found in case of steel plate having a thickness of between 2.6–3.2 mm and copper plate having a thickness of between 0.1–0.25 mm.

In the embodiment of the present invention, steel plates (1) (2) can be bonded by melting a copper plate (5) sandwiched therebetween at a temperature lower than the melting temperature of steel. The occurrence of heat stress of the steel plates is quite small, thereby preventing the deformation of the V-groove (3).

In the embodiment, steel plates (1) (2) having the same configuration are used. It is possible to use the steel plates having different configurations.

As described above, in accordance with the present invention, a metal plate having a relatively low melting temperature is sandwiched between two steel plates to carry out a friction welding of three bodies. The heat stress can be minimized in comparison with the conventional pulley device because it is unnecessary to heat over the melting temperature of the steel plates. Thus, a pulley device of more economical and a high reliability can be obtained.

I claim:

1. A pulley device having an axis of rotation and a V-groove for passing a V-belt, said pulley device comprising:
   (a) a pair of steel plates formed by stamping, said steel plates having centrally located, mutually opposing planar surfaces perpendicular to the axis of rotation of said pulley device and diverging away from each other to form the V-groove outwardly of said centrally located planar surfaces; (b) a generally planar metal plate formed from a metal having a melting temperature lower than the melting temperature of said steel plates and selected from the group consisting of copper and copper alloys sandwiched between said steel plates so as to make planar contact with said planar surfaces on said steel plates, the ratio of the thickness of said planar metal plate to the thickness of said steel plates being less than 1:10, said planar metal plate being coextensive with said planar surfaces on said steel plates and being positioned so as to prevent contact between said steel plates in the welded, assembled condition of the pulley device;

(c) said steel plates and said planar metal plate having concentric, axial through-holes therethrough for receiving a shaft; and (d) the elements of the pulley device having been friction welded together by rotating at least one of said steel plates so as to melt bond said planar metal plate to both of said steel plates at a temperature beneath the melting temperature of said steel plates, thereby minimizing heat stresses in said steel plates.

* * * * *